UNITED STATES PATENT OFFICE.

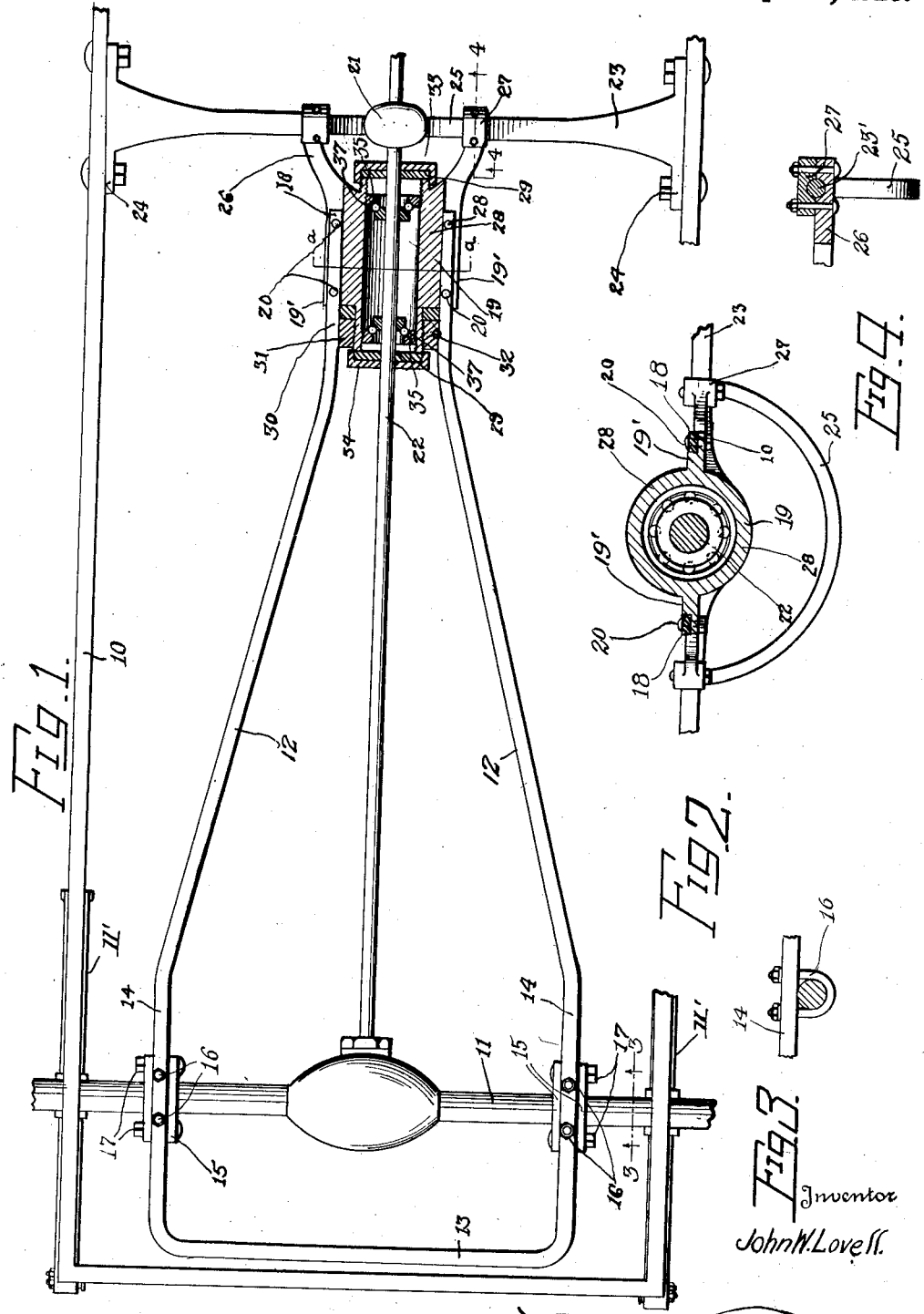

JOHN W. LOVELL, OF CABERY, ILLINOIS.

AUTOMOBILE-CHASSIS.

1,338,383.  Specification of Letters Patent.  Patented Apr. 27, 1920.

Application filed July 30, 1919. Serial No. 314,321.

*To all whom it may concern:*

Be it known that I, JOHN W. LOVELL, a citizen of the United States, residing at Cabery, in the county of Ford, State of Illinois, have invented certain new and useful Improvements in Automobile-Chassis; and I do hereby declare the following to be a full, clear, and exact description of the invention, such as will enable others skilled in the art to which it appertains to make and use the same.

This invention relates to motor vehicles and it has for its object to provide a supplemental frame to be connected with the rear axle housing and with the forward portion of the main frame, in such manner as to hold the rear axle against movement longitudinally of the vehicle, while permitting of free movement of the main frame with respect to the rear axle, upon its springs. Thus, no driving strains are carried by the springs, which serve solely to sustain yieldably the body of the vehicle.

In the drawings forming a portion of the specification,

Figure 1 is a plan view of a portion of the main frame of a motor vehicle and rear axle and drive shaft, associated with the present invention.

Fig. 2 is a section on line *a—a* of Fig. 1, with the upper half of the bearing casing of the attachment in place.

Fig. 3 is a detail section on line 3—3 of Fig. 1.

Fig. 4 is a section on line 4—4 of Fig. 1.

Referring to the drawings, there is shown a portion of the main frame of a motor vehicle, indicated at 10, transversely of the rear end portion of which is disposed the axle-casing 11, between which and the under side of the frame are disposed the usual springs 11', that are held to the axle casing in the usual manner, such structure forming no part of the present invention.

The present attachment, includes a supplemental frame comprising side members 12 and a connecting transverse portion 13 at one end thereof. Directly adjacent to the portion 13, the side members are parallel, as shown at 14, after which they converge and then finally terminate in parallel end portions 18, of comparatively short lengths.

The supplemental frame is disposed with its parallel portions 14 across the rear axle housing 11, in which position they are held by any suitable means, such as the U-bolts 16, the side members 12, extending forwardly of the main frame and at opposite sides of and spaced from the drive shaft 22 of the vehicle, and which latter shaft, may have but one universal joint, indicated at 21.

The forward end of the supplemental frame is connected with the sides of the main frame, through the medium of a casing 19 of cylindrical form, having radiating flanges 19', which are channeled in their upper faces to receive the forward end portions 18 of the supplemental frame that are held in place therein by means of the bolts 20.

From the forward end of the casing 19, there extend divergingly, the arms 26, at the extremities of which are the bearings 27 in which are pivotally received the rounded portions 23' of a support 23 that is disposed transversely of the main frame 10. The ends of the support 23 are provided with flanges 24, through the medium of which the support is bolted to the main frame, and the central portion of the support is arched downwardly, as shown at 25, to pass under the drive shaft 22 at its universal joint 21.

Within the end portions of the cylindrical casing 19 are screwed the race members 35, with which coöperate the race members 36, carried by the shaft 22, and which race members jointly carry the bearing balls 37, so that a ball-bearing is provided between the drive shaft and the casing 19. At each end of the cylindrical casing, there is a dust washer 29, over which is engaged a cap 34 that is screwed onto the end of the casing and through which the drive shaft passes.

With this construction it will be seen that the rear axle is swingingly mounted on an axis that coincides with a pivotal axis of the universal joint, so that the main frame and therewith the body of the vehicle may rise and fall upon the springs without interference from the supplemental frame, which latter will take the thrust that ordinarily is transferred through the springs.

What is claimed is:—

An attachment for motor vehicles comprising a frame including side members adapted at their rear end portions for connection with the rear axle of a motor vehicle, a casing having radiating flanges at opposite sides and upon which the forward end portions of the side members are respectively secured, arms extending forwardly from the casing and having transversely alined bearings, a support adapted for connection transversely of a vehicle frame and having bearing members pivotally engaging the bearings of the arms respectively, and spaced bearings carried by the casing in position to support the motor vehicle drive shaft with its universal joint coincident with the common axis of the bearings of said arms.

In testimony whereof I affix my signature in the presence of two witnesses:

JOHN W. LOVELL.

Witnesses:
W. H. TRECKER,
E. W. DAWN.